Patented Feb. 6, 1934

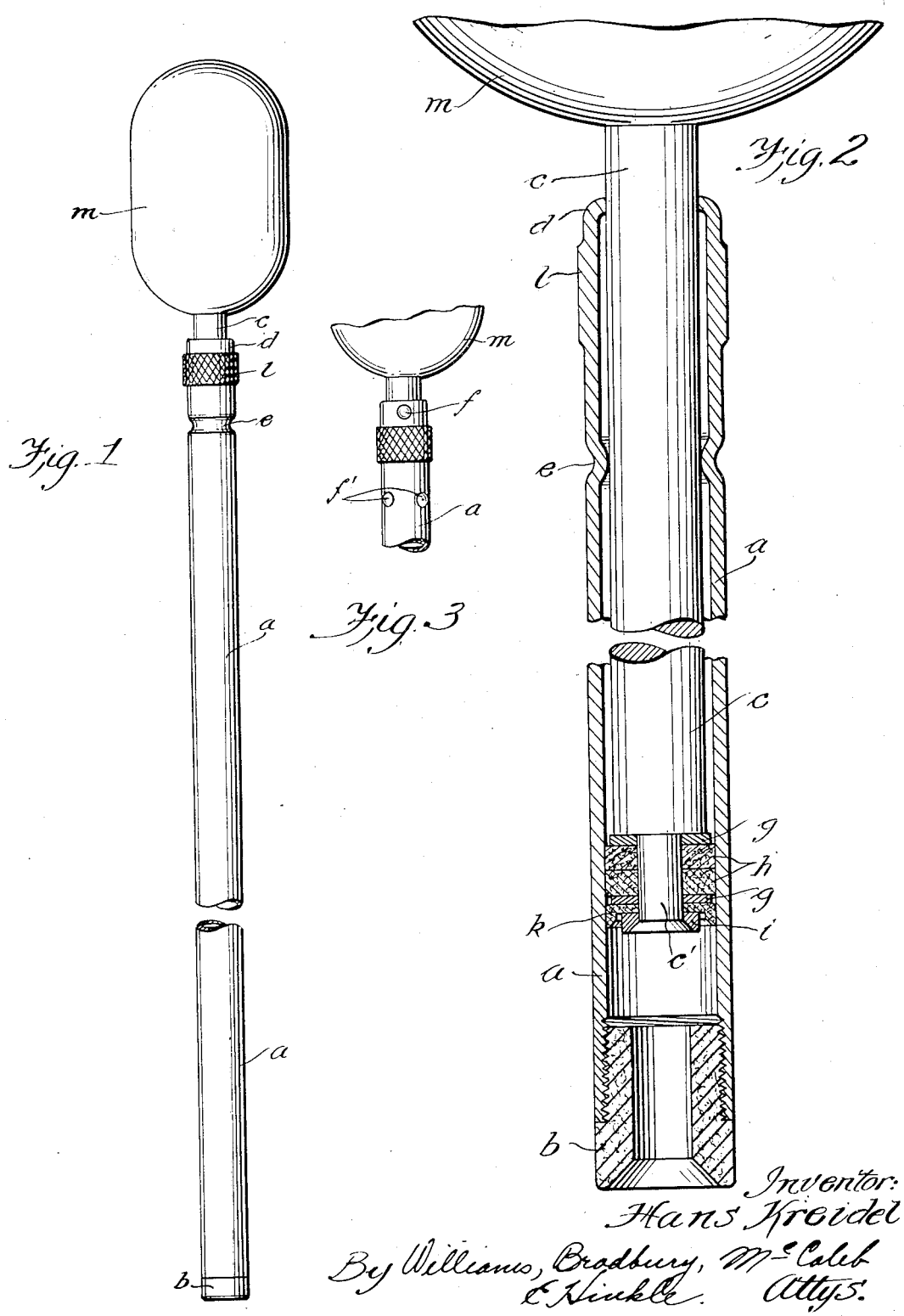

1,945,555

UNITED STATES PATENT OFFICE 1,945,555

HAND-OPERATED SUCTION AND PRESSURE PUMP FOR LUBRICATING PURPOSES

Hans Kreidel, Wiesbaden, Germany

Application December 19, 1931, Serial No. 582,165, and in Germany July 13, 1931

2 Claims. (Cl. 221—47.3)

The invention relates to hand-operated suction and pressure pumps for supplying oil under high pressure to oilers and branched oil tubes leading to bearings to be lubricated, thereby insuring simultaneous lubrication of all of the bearings or other points to be lubricated which are connected to the oiler or tube being supplied with oil. The construction of the pump is such as adequately to fulfill the requirements of a pump used for this purpose. In order to accomplish the desired functions the pump is designed so as to be capable of being filled by suction directly from the oil supply container, and to deliver the oil under high pressure, thereby to overcome the bearing resistances encountered in the operation of cleaning and lubricating bearings. In practice it has been found that pressures in the order of fifteen thousand pounds per square inch may be developed with the pump of the present invention even when using slightly viscous oil as the lubricant.

The pump is simple in its construction, reliable and efficient in its operation. It is provided with a nozzle part that ensures a lubricant-tight seal and with a specially designed suction and pressure piston suitable to maintain full sucking action even after the pump has been out of use for a prolonged time. Since the pump will often have to overcome high counter pressures, the diameter of the piston must not exceed 10 millimeters. On the other hand the pump should have a displacement in the order of 10 to 15 cubic centimeters. As a result the length of the operating cylinder will be from 20 to 30 times the diameter of the piston. The great cylinder length makes necessary a reliable guide for the piston rod and the latter must be of ample diameter to stand the stresses to which it is subjected owing to the high pressures. The diameter of the latter will, for this reason, differ only slightly from that of the cylinder. In use the pump nozzle is forcefully pressed against the metal nipple or lubricant receiving fitting of the part to be lubricated. It must make a reliable lubricant-tight seal and yet be sufficiently rigid and durable to withstand wear and generally maintain its form. These requirements are satisfied by making the nozzle part of a non-metallic material such as fibre, ebonite, or the like, which materials yield to a certain extent when the nozzle part is pressed against the fitting and thus make possible a lubricant-tight seal merely by pressure contact. A further advantage, which accrues by using a nozzle part made of fibre or the like, is that the nozzle part may be screwed directly into the end of the cylinder barrel and will form a leak-proof threaded joint without the necessity of using a gasket or packing. Fibre provides a good tightening combined with a high resistance against pressure and a reduced wear; it provides moreover a sufficient tightening in the thread of the barrel so that no special gasket is required at this place. The nose part and pump cylinder are of the same outside diameter and are suitably united by screwing the parts together, for example so as to provide a smooth outer surface from which the oil flows easily off after dipping the pump into the tank for sucking in the lubricant.

The accompanying drawing shows one way of how the invention can be carried out.

Fig. 1 is an elevation of the improved lubricant pump;

Fig. 2 is an enlarged central longitudinal sectional view thereof; and

Fig. 3 is a fragmentary elevation of the upper end of the pump cylinder showing a modified form of means for guiding the piston rod.

The pump cylinder $a$ which is made of metal is provided with a non-metallic—fibre for example— nozzle part $b$ which is directly screwed to the former. The piston rod $c$ is given, in consequence of the high stresses it has to stand, a diameter that is almost equal to that of the pump cylinder. The inwardly extending flange part $d$ at the upper end of the cylinder $a$ serves as a guide for the piston rod $c$. An annular inwardly extending rib $e$ located at some distance from the flange part $d$ is provided as an additional means to guide the piston rod. In the modified form of construction shown in Fig. 3, inwardly projecting knobs $f$, $f'$, are formed in the cylinder wall and serve as guides for the piston rod. The annular inwardly extending rib $e$, and in the modified form the knobs $f$, serve as stops to limit the retractile stroke of the piston. The combined suction and pressure piston is fitted to an appropriately shaped extension $c^1$ of the piston rod and consists of flat leather discs $h$ arranged between two metal discs $g$ for effecting the sucking action, and a cup leather $k$ arranged between the lower metal disc and a further metal disc $i$ of smaller diameter for effecting the pressing action. The cup leather $k$ has the same diameter as the cylinder and its circumferential flange always bears on the inner wall of the pump cylinder. All the discs are securely fitted to one another so as to form in this way a combined suction and pressure piston which is reliable in operation. The uppermost metal disc $g$ comes to rest against the stops d or f upon withdrawing the piston and in this way all deformation or deterioration of the leather discs is prevented. Part of the outer surface of the cylinder at l is knurled to provide ease of manipulation of the pump in use. The handle m of a lengthy everywhere rounded off form is made of wood, and is suitably fitted to the upper end of the piston rod extending from the cylinder.

Having thus described my invention what I claim as new and desire to secure by Letters Patent is:

1. A high pressure grease gun comprising a relatively long small-diameter tube having an inwardly turned annular flange at one end thereof and having an annular inwardly spun projection adjacent said end, a piston rod reciprocable in said tube and guided by said flange and said projection, said piston rod having a diameter nearly as great as that of said tube, a piston secured to said rod and forming a seal against the walls of said tube when moved in either direction, and a connector for making a contact seal with a lubricant receiving fitting secured in the end of said tube opposite said flange, said connector having a passageway in open communication with the bore of said tube and having its peripheral surface lying substantially in a prolongation of the external surface of said tube.

2. A high pressure lubricant pump comprising a relatively long small-diametered tube having piston rod guide means formed integrally therewith, a piston rod reciprocable in said tube and guided by said means, said piston rod having a diameter nearly as great as that of said tube, a piston secured to said rod and forming a seal against the walls of said tube when moved in either direction, and a nozzle made of fibre and threaded in the end of said tube, said nozzle having a portion of substantially the same diameter as the external diameter of said tube thereby to form a shoulder abutting against the end of the tube, said nozzle having a surface conformed to make contact with a lubricant receiving fitting and having a passageway extending through said contact surface to provide communication with the bore of said tube.

HANS KREIDEL.